United States Patent [19]

Tortorelli

[11] Patent Number: 5,720,794
[45] Date of Patent: Feb. 24, 1998

[54] AMMONIUM NITRATE PARTICULATE FERTILIZER AND METHOD FOR PRODUCING THE SAME

[75] Inventor: Louis J. Tortorelli, DeRidder, La.

[73] Assignee: Mississippi Chemical Corporation, Yazoo City, Miss.

[21] Appl. No.: 689,103

[22] Filed: Jul. 30, 1996

[51] Int. Cl.$^6$ .................................................. C05C 1/02
[52] U.S. Cl. .................. 71/59; 71/60; 71/64.05; 71/64.06; 149/46; 423/267; 423/396
[58] Field of Search .................................. 71/58, 59, 60, 71/64.05, 64.06, 35; 149/46; 423/266, 267, 396

[56] References Cited

U.S. PATENT DOCUMENTS 3,649,173  3/1972  Falck-Muss et al. ................. 71/35

*Primary Examiner*—Ferris Lander
*Attorney, Agent, or Firm*—Oblon, Spivak, McClelland, Maier & Neustadt, P.C.

[57] ABSTRACT

An improved particulate, ammonium nitrate is prepared with 2.0–6.0 percent by weight potassium sulfate. The potassium sulfate suppresses crystalline phase IV⇌III transitions in the ammonium nitrate particles while undergoing temperature variations between 18°–42° C. The resulting fertilizer, which may be further coated to further suppress dusting, exhibits superior resistance to caking, clumping and cracking.

15 Claims, 11 Drawing Sheets

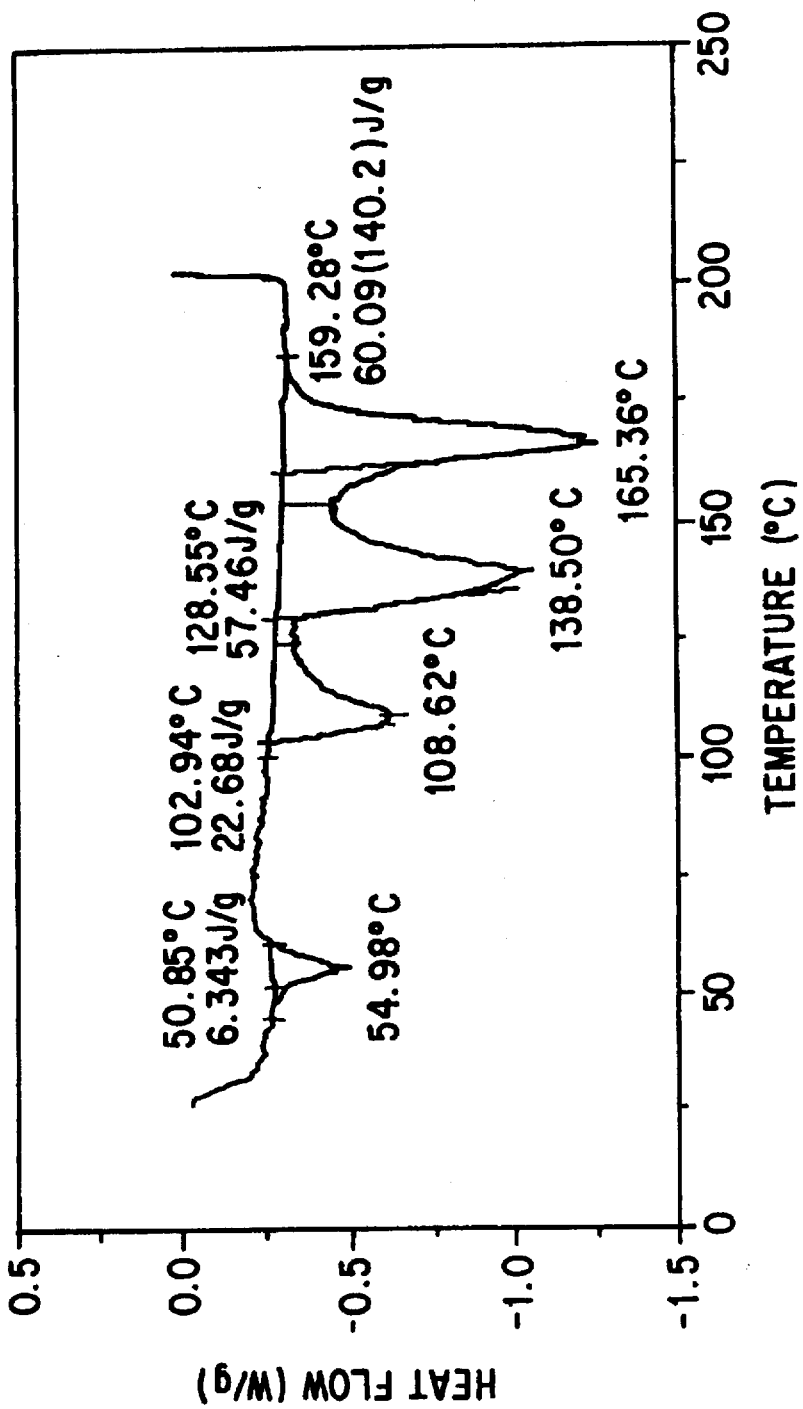

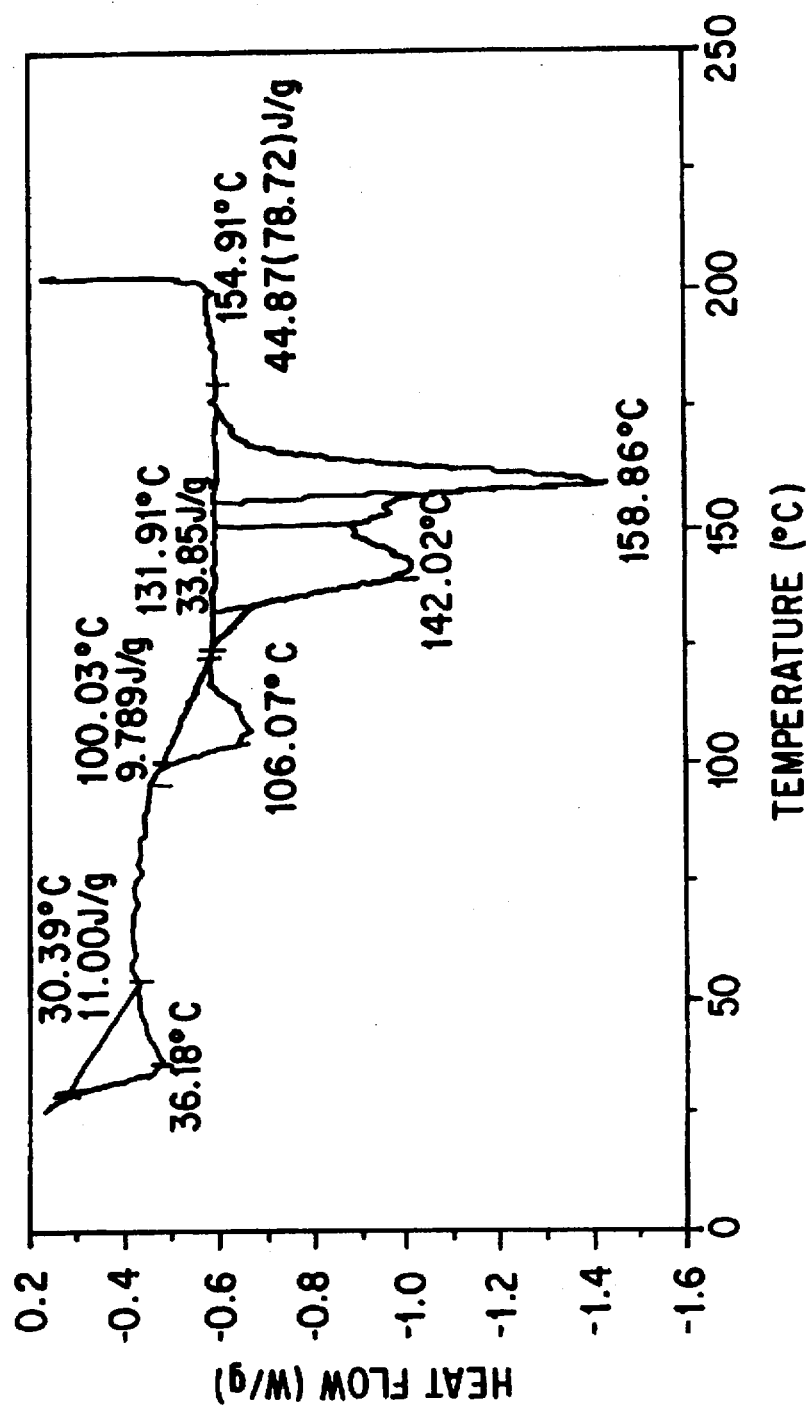

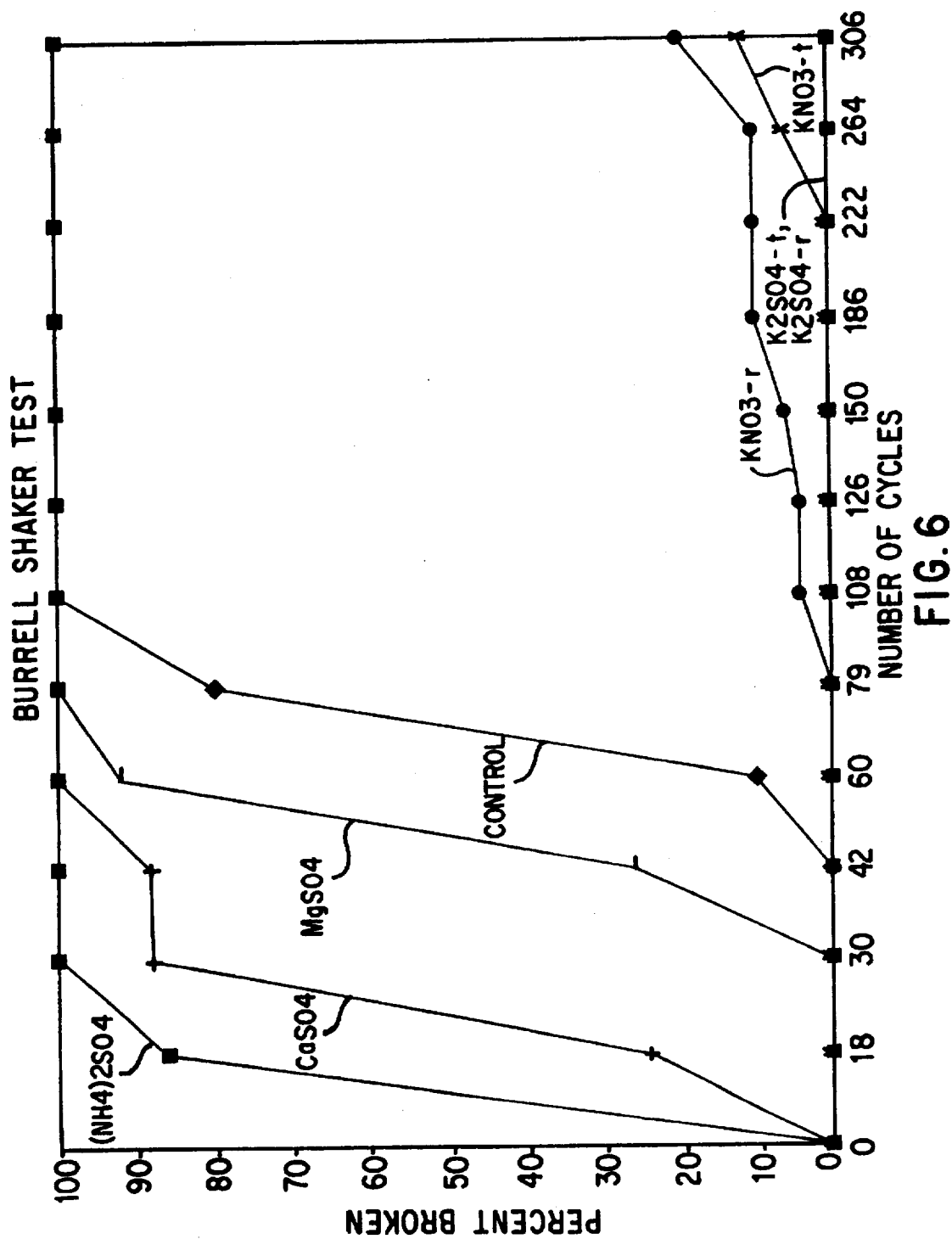

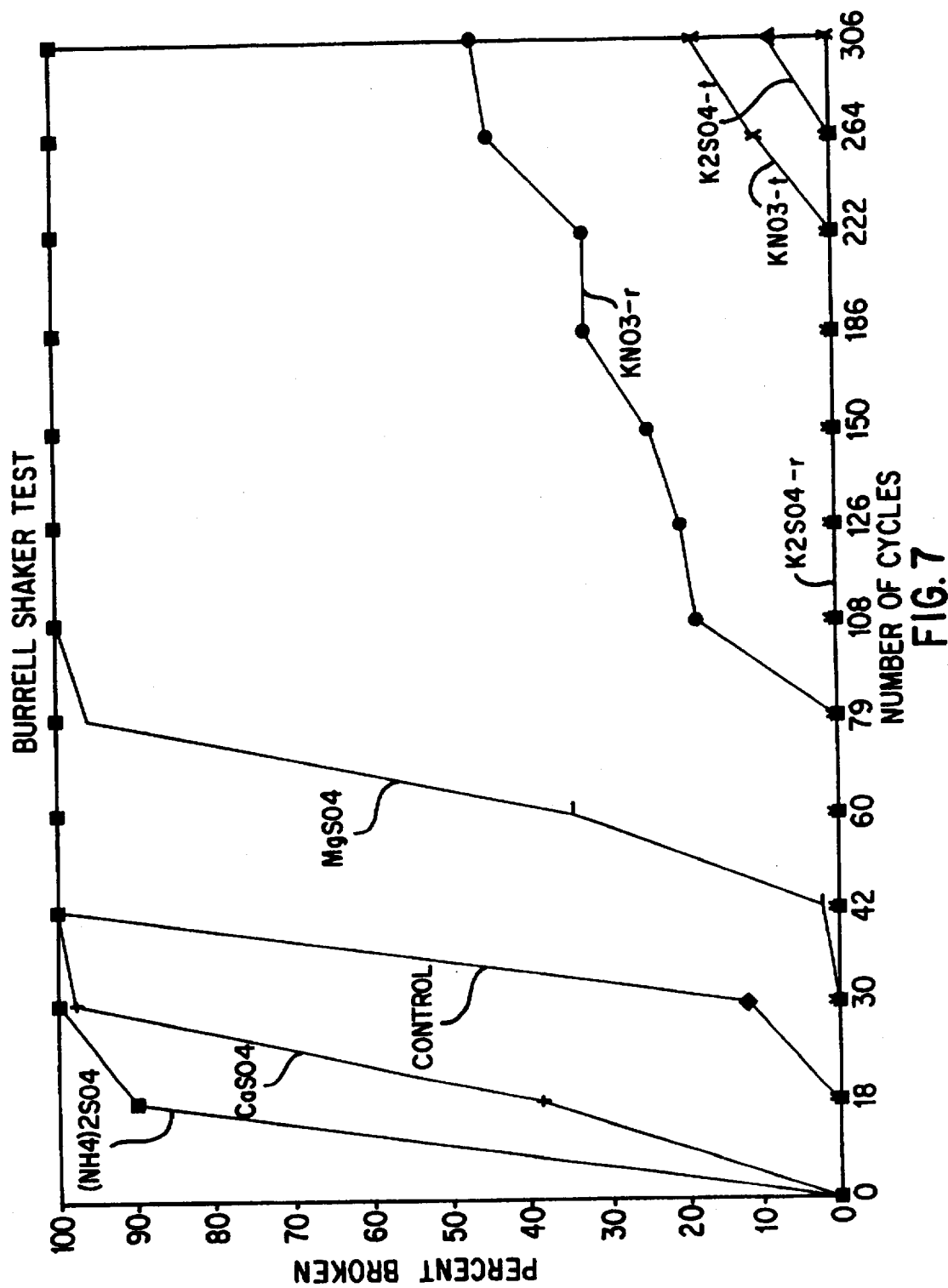

AMMONIUM NITRATE PARTICULATE FERTILIZER AND METHOD FOR PRODUCING THE SAME

BACKGROUND OF THE INVENTION

1. Field of the Invention

This invention pertains to particulate ammonium nitrate fertilizer. More specifically, ammonium nitrate fertilizer is rendered more resistant to breakdown into fines, to particle bridging, and to caking by the addition of potassium sulfate. The resulting fertilizer does not exhibit the IV⇌III crystalline phase transition at ambient storage conditions as does ammonium nitrate without the potassium sulfate additive.

2. Background of the Prior Art

Particulate ammonium nitrate is a commonly used plant fertilizer. Usually provided in nearly spherical particles referred to as prills, this fertilizer typically provides 34% nitrogen by weight to the crops being fertilized. Under cool, dry storage conditions, the product remains in good physical condition. However, under summer storage conditions of 25°–42° C. and 40–90 percent relative humidity, particulate ammonium nitrate has been shown to suffer physical degradation, including particle breakdown, bridging, and cracking.

High-Density (Hi-D) ammonium nitrate particles, or prills, are produced from melt containing 0.3% water, or less; therefore, the prills are essentially anhydrous. Ammonium nitrate is, however, hygroscopic and will absorb moisture during storage. Fertilizer particles in the absence of "free" (i.e. unbound) water do not undergo the IV⇌III crystal phase transitions. As sufficient moisture is absorbed from the ambient air, the IV⇌III phase change can occur; the precise temperature of the change varies with the amount of water present. (Griffith, J., *Chem. Eng. Data*, 8:22 (1963).) Additives, used by some ammonium nitrate producers, which bind moisture in the form of a hydrate (e.g.; $Mg(NO_3)_2 + 2H_2O \rightarrow Mg(NO_3)_2 2H_2O$), prevent the absorbed moisture from remaining in a free state. Therefore, absorbed moisture must exceed the amount necessary to fully hydrate the additive before it can initiate the IV⇌III phase transition.

There is a substantial particle volume change associated with the IV⇌III crystal phase change (Miller, P. et al., *Industrial and Engineering Chemistry*, Vol. 40, No. 1, pp. 154–160 (1948)). As the storage temperature cycles after free water has become present, the particles alternatively swell and shrink, inducing formation of cracks in the particles themselves, and crystals from separate particles, fusing into a single mass. Repeated phase IV⇌III changes are also associated with production of a large amount of undesirable "fines".

Various approaches have been adopted to address particulate ammonium nitrate fertilizer's physical instability. In addition to the use of hydrating agents such as $MgNO_3$ and $(Al)_2(SO_4)_3$, a great variety of other additives have been employed, including nitrates, phosphates, sulfates and oxides of various metals. (See, e.g., Russo, *Product Research and Development* 7:69 (1968) as well as U.S. Pat. Nos. 3,630,712 and 3,018,164.) An alternative approach is described in U.S. Pat. No. 4,521,239, commonly assigned herewith, and incorporated herein-by-reference. In this patent, the prills, formed from a concentrated ammonium nitrate solution to which is added magnesium nitrate, are coated with the reaction product of an amine and a siloxane. The coating is effective in suppressing moisture absorption by the ammonium nitrate. However, it has been impractical thus far to apply enough coating to render the prills completely impervious to moisture absorption.

French patent publication 2,061,631 (and the equivalent teaching in German Offenlegensschrift 3,044,752) describe the suppression of crystal phase IV⇌III changes in particulate ammonium nitrate through the addition of 10 percent–50 percent, (wt/wt) potassium sulfate ($K_2SO_4$). The publication specifically requires a minimum of 10 percent potassium sulfate, (see page 4 of the references) indicating that below this minimum, no appreciable suppression of the phase change is achieved. The reference notes that ammonium nitrate particles not containing at least 10% potassium sulfate, can experience a 3.6 percent volume change during the IV⇌III phase transition at 32° C.

The addition of 10–50 percent of potassium sulfate (wt/wt) to commercial ammonium nitrate fertilizers is not economically feasible. Too much nitrogen is replaced in the product, rendering it less competitive against fertilizers having a higher nitrogen content. Preferably, no more than 6 percent by weight, of potassium sulfate, and more preferably, less than 4 percent by weight, of ammonium nitrate should be replaced by additives intended to stabilize the ammonium nitrate particles and yet remain economically competitive.

Accordingly, it remains an object of those of skill in the art to provide a more highly stabilized particulate ammonium nitrate fertilizer, which resists IV⇌III phase changes at the typical 25°–42° C., which exhibits reduced cracking, caking, and production of increased fines during storage.

SUMMARY OF THE INVENTION

The above objects, and others made more evident in light of the detailed disclosure set forth below, is met by providing an ammonium nitrate particulate fertilizer which contains between 2.0–6.0 weight percent potassium sulfate. The addition of 2.0–6.0 percent potassium sulfate to the ammonium nitrate dramatically suppresses IV⇌III crystalline phase transitions of the ammonium nitrate during temperature cycles in the ambient storage. The particulate ammonium nitrate is made according to the general process described in U.S. Pat. No. 4,521,239. An ammonium nitrate solution is prepared by reacting ammonia with nitric acid. The ammonium nitrate solution is then concentrated to—in general—above 99% ammonium nitrate. In some conventional processes, this concentrated solution is reacted with magnesium oxide to produce a mixture of ammonium nitrate and magnesium nitrate. In the inventive process, magnesium may be added, but is not required. 2.0–6.0 weight percent potassium sulfate is added to the melt and then formed into particles, by prilling, prill "fattening", granulation, etc.

The potassium sulfate may be in the form of a dry salt ($K_2SO_4$), a mixture of the salt, or in separate components; e.g., potassium nitrate and sulfuric acid.

The ammonium nitrate fertilizer of the claimed invention has improved resistance to caking, swelling, cracking and other fines-forming events caused by the subsequent IV⇌III transitions during storage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 depicts differential scanning calorimeter (DSC) scans from 24° C.–200° C. of lab-prilled pure ammonium nitrate (used as a testing control sample).

FIG. 2 depicts differential scanning calorimeter (DSC) scans of lab-prilled ammonium nitrate containing 2.4% reagent-grade ammonium sulfate as an additive.

FIG. 3 depicts differential scanning calorimeter (DSC) scans of lab-prilled ammonium nitrate containing 3.2% technical grade potassium nitrate. FIG. 3A shows results where moisture equals 0.23% and FIG. 3B shows results where moisture equals 1.94%.

FIG. 4 depicts a differential scanning calorimeter (DSC) scan of lab-prilled ammonium nitrate containing 2.3% technical grade potassium sulfate.

FIGS. 6 and 7 depict results from the Burrell Shaker test. This test measures the resistance of the ammonium nitrate particles to breakage caused by a combination of repeated thermal and physical shocks.

DETAILED DESCRIPTION OF THE INVENTION

Figure 1A:
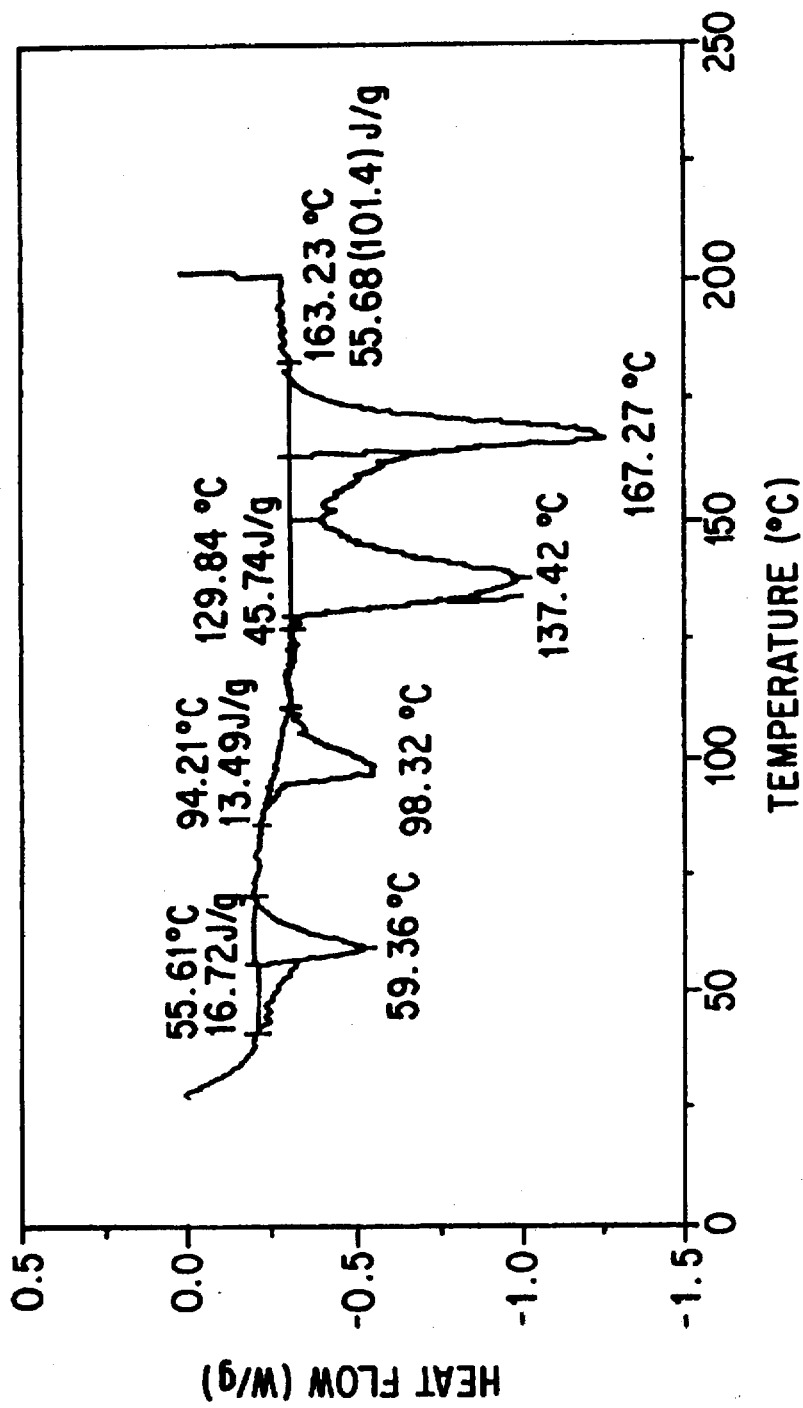
FIG. 1A shows results where prill moisture equals 0.57%

The improved particulate ammonium nitrate fertilizer of this invention is characterized by the presence of 2.0–6.0 weight percent potassium sulfate. As made clear in the examples set forth below, the potassium sulfate suppresses the tendency of the ammonium nitrate to undergo IV⇌III crystalline phase transitions, which otherwise occur at ambient storage conditions of 25°–42° C. and relative humidity values of 40–90%. Below 2.0% potassium sulfate, suppression of the IV⇌III phase transition is not completely achieved; however, it is suppressed to some degree. Thus, ammonium nitrate fertilizers with less than about 2.0% potassium sulfate will continue to exhibit a tendency to generate fines, to clump, cake, and to crack. No further improvement in the suppression of the phase transition is observed above 6.0% potassium sulfate. Also, the fertilizer begins to suffer from loss of nitrogen content, due to the dilution effect of potassium sulfate. While potassium sulfate has been used in the prior art practices as a source of sulfur for fertilizers, such does not embrace the present invention since the amount of potassium and sulfur are very small in comparison to "fertilization" amounts.

Other conventional ammonium nitrate fertilizer additives may also be employed, but do not constitute an inventive aspect of the invention, per se. While phase transition is suppressed across the range of 2.0–6.0 weight percent potassium sulfate, 2.5–3.5 percent is a preferred range. This amount offers excellent suppression of phase transition, while maintaining the weight percentage of potassium sulfate sufficiently low such that the percentage of nitrogen in the ammonium nitrate fertilizer remains high.

The suppression of the IV⇌III phase transition eliminates the 4% volume increase that occurs during storage. Without the volume increase, the ammonium nitrate particles will not absorb significant amounts of fuel oil or related oily compositions.

The process for preparing ammonium nitrate particulate fertilizer is essentially that disclosed in U.S. Pat. No. 4,521,239. The potassium sulfate is advantageously added to the ammonium nitrate solution at a location in the process following the reaction between nitric acid and ammonia. For ease of practice, the potassium sulfate is preferably added after concentration of the ammonium nitrate solution, such that concentrations of the ammonium nitrate are above 90%, typically above 95%, and most preferably at or above 99%. The potassium sulfate must be added to the ammonium nitrate prior to its formation into cool particulate. Magnesium oxide, aluminum oxide, and other additives can similarly be added with the potassium sulfate to the concentrated ammonium nitrate solution, or melt. This provides for thorough, uniform distribution of the materials throughout the prills, leading to a high and consistent quality.

The effectiveness of the invention in suppressing formation of fines, and in particularly reducing fertilizer caking, breaking down into fines, and cracking, is more fully illustrated in the examples set forth below.

EXAMPLE 1

Preparation of Test Particles

The bulk of the research for this invention was performed on ammonium nitrate containing the internal additive, magnesium nitrate. Experiments were also performed on ammonium nitrate (i.e., reagent grade) without the internal additive; and similar results were obtained. The ammonium nitrate melt containing magnesium nitrate for the research was obtained from the production facility down-stream of the evaporator. Magnesium-free ammonium nitrate melt was acquired at a point in the process upstream of the evaporator. The ammonium nitrate melt which did not contain magnesium was concentrated in the laboratory to about 99.6% ammonium nitrate, i.e., equivalent to melt following the production-scale evaporator.

Varying amounts of additives (reagent and technical grades) were added to about 1200 g of molten ammonium nitrate in a 1,000 ml beaker. The contents were stirred until the mixture was homogeneous. The beaker was wrapped with heating tape to provide a uniform temperature throughout the sample preparation. The solutions were sparged with anhydrous ammonia to keep the pH between 6.4 and 6.9. The molten material was then transferred to a stainless steel pan (24.1 cm×15.2 cm×5.1 cm) in which an ammonia sparger was also present to maintain the pH of an 8% solution of the melt in water at about 6.4. The temperature of the melt was kept at about 182° C. in the stainless steel pan. "Control" particles were also made in the lab by the same procedure from ammonium nitrate melt obtained from the production facility.

Teflon sheets (20.32 cm×12.7 cm×0.3 cm) having 587 "dimples" were used to prepare the test particles. The dimples (0.3 cm deep) were made using a 0.278 cm common drill bit. Each dimple was pierced at the bottom with a #78 common drill bit. These holes facilitated removal of air bubbles from the dimples while they were being filled with melt. The dry Teflon sheets, initially at room temperature, were placed in the stainless steel pan containing the molten ammonium nitrate/additive. As the temperature of the Teflon sheets increased, the molten salt flowed off the top of the sheets leaving the dimples filled with the melt. The Teflon sheets were then removed from the pan and placed in a desiccator. The laboratory-prepared particles were removed after the temperature of the sheets had decreased to room temperature.

The lab-prepared particles produced in the above-described manner were uniformly sized, –6/+8 (U.S.A. Standard Testing Sieve), pellet-shaped products. Analytical data for the laboratory prepared products are given in Table 1.

EXAMPLE 2

Differential Scanning Calorimeter (DSC)

Figure 1B:
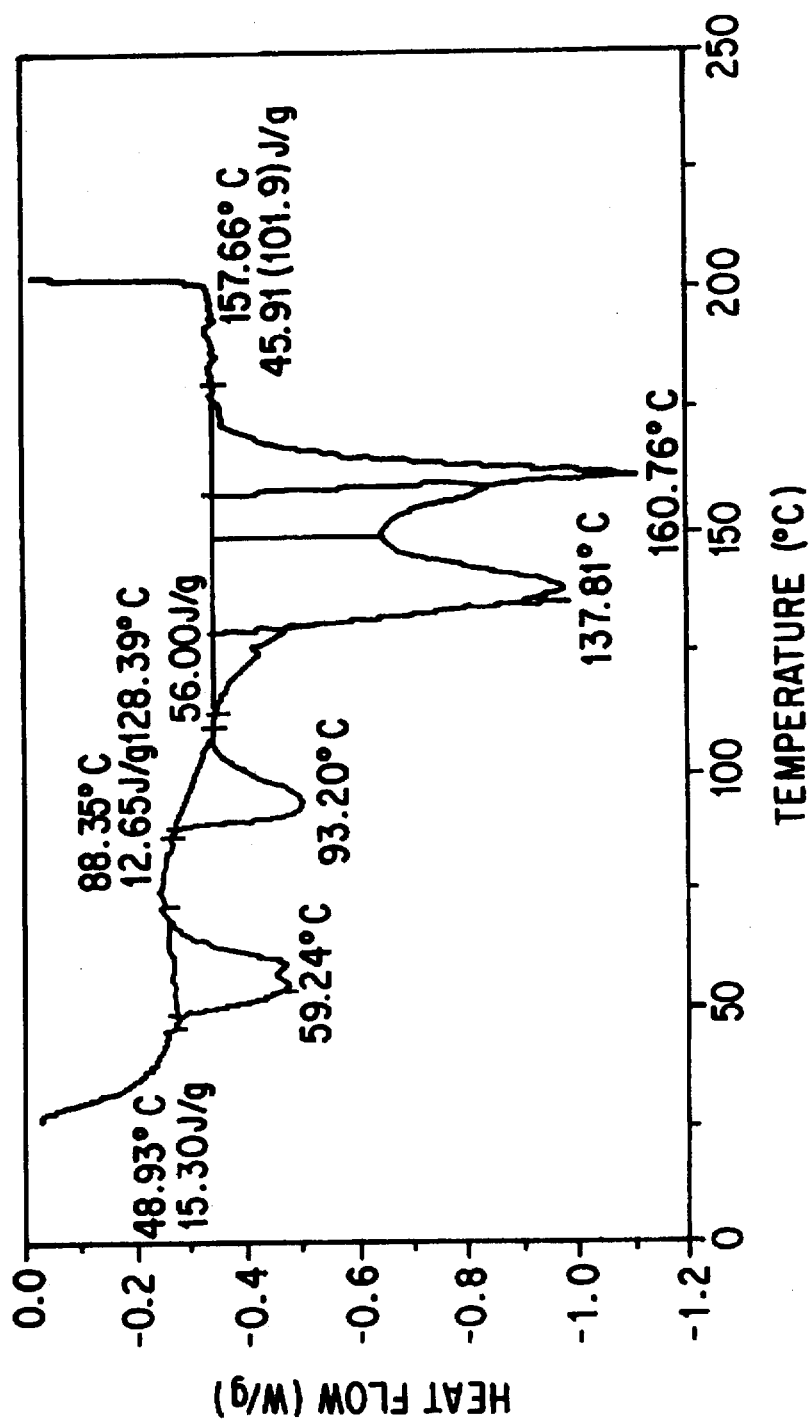
FIG. 1B shows results where moisture equals 1.64%.
Figure 2A:
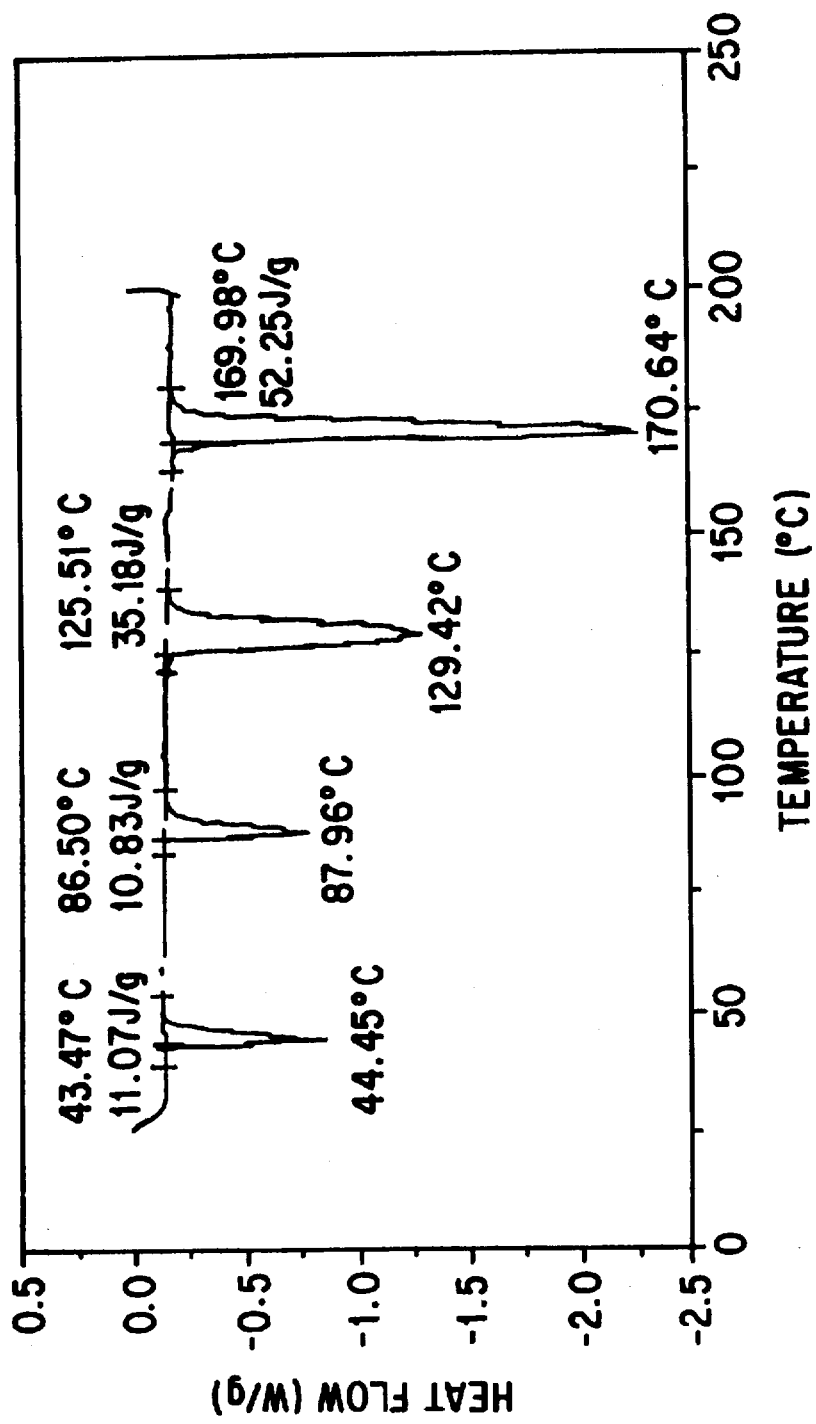
FIG. 2A shows results where prill moisture equals 0.23%
Figure 2B:
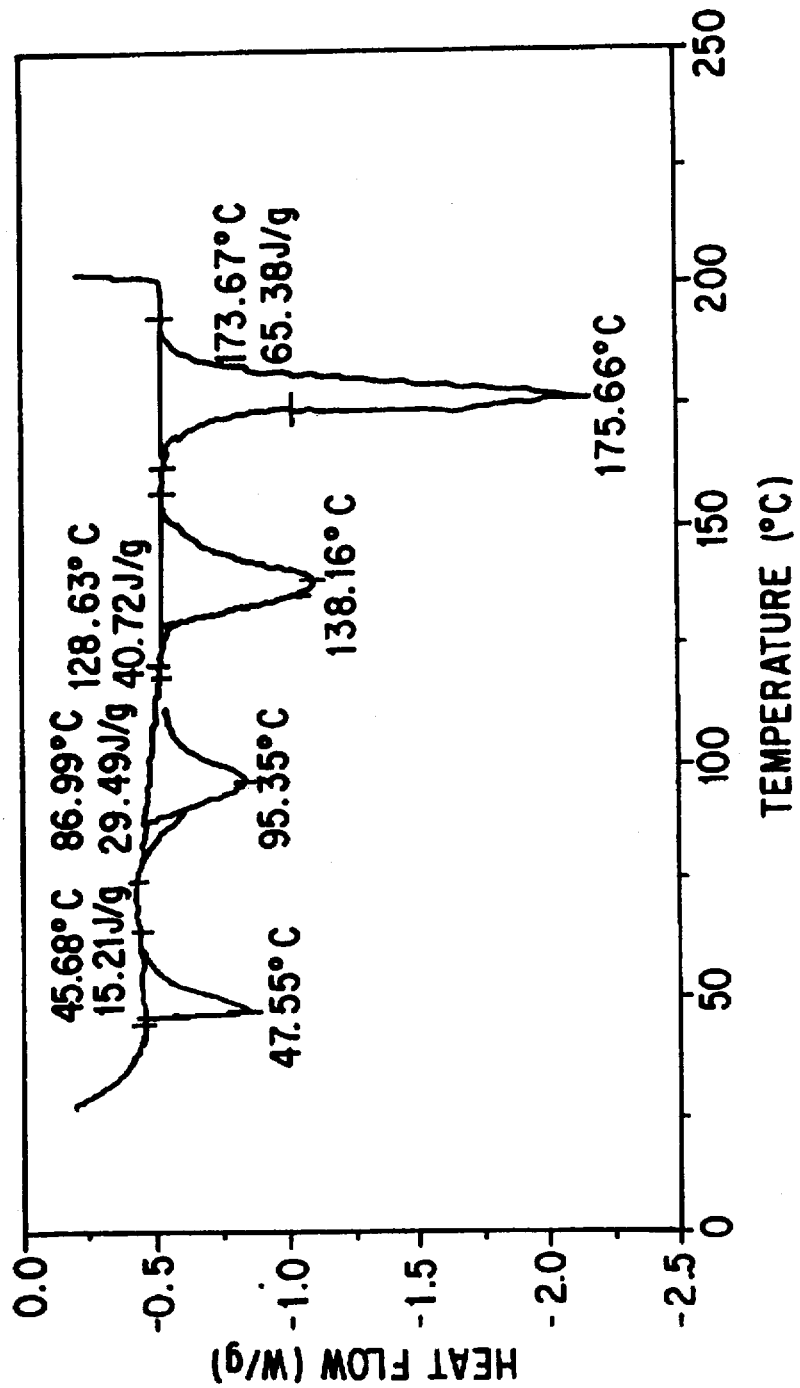
FIG. 2B shows results where moisture equals 1.51%.
Figure 4A:
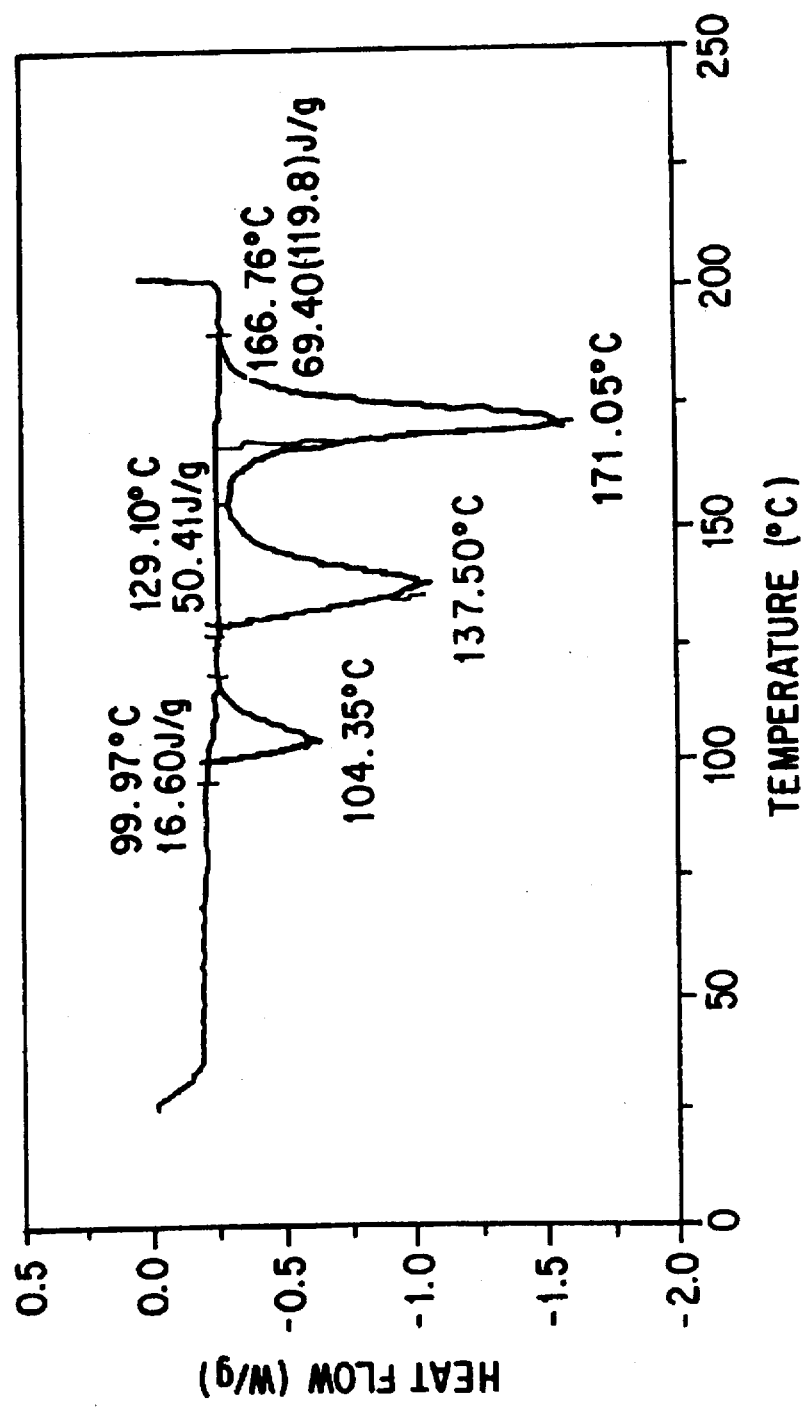
FIG. 4A shows the results where moisture equals 0.26%.
Figure 4B:
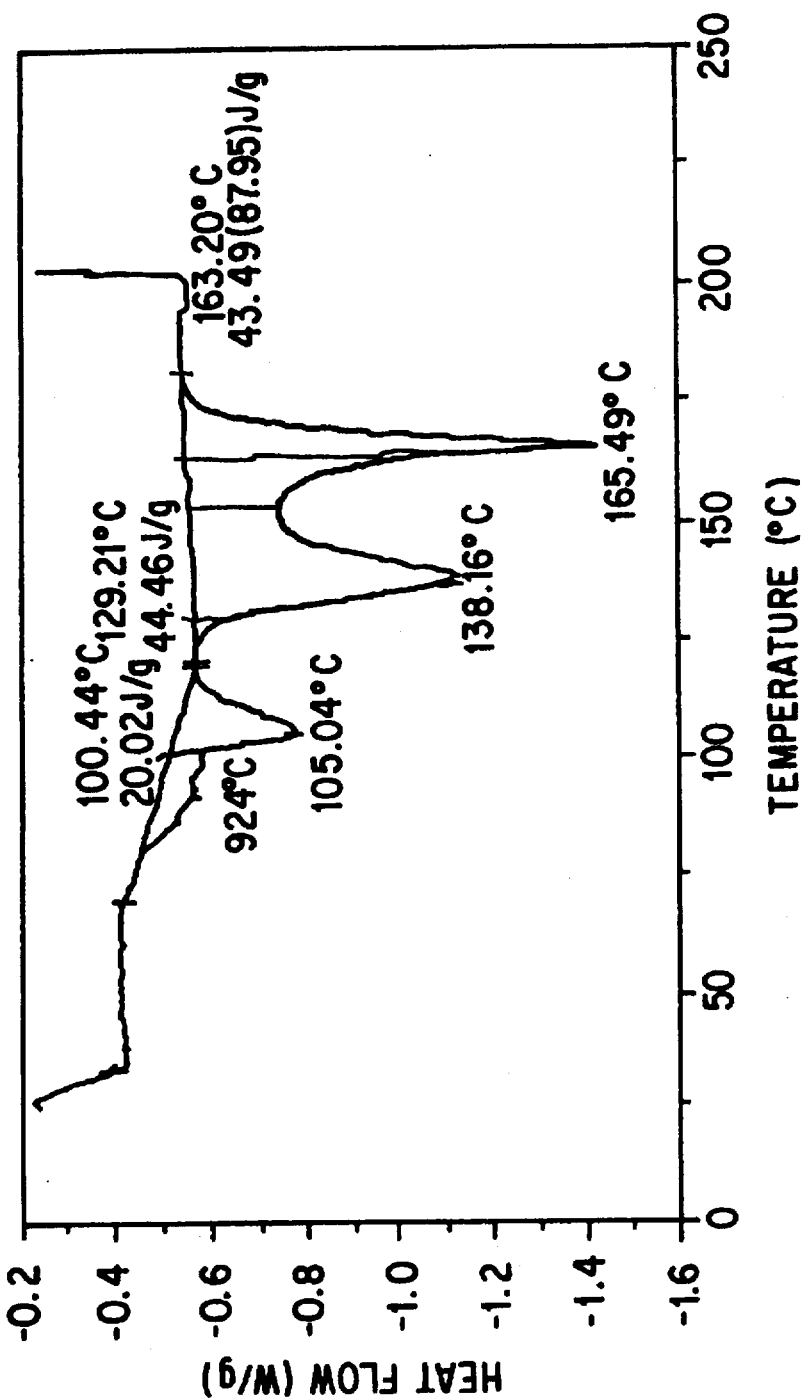
FIG. 4B shows the results where moisture equals 2.30%.

The differential scanning calorimeter was used to determine product crystalline form at a given temperature. When ammonium nitrate contains potassium sulfate at a concentration of at least 2.6 weight %, there is no IV⇌III crystalline phase transition observed in the DSC scan (FIG. 4). The DSC scans of (FIG. 1) ammonium nitrate (control), (FIG. 2) ammonium nitrate/ammonium sulfate (at least 2.43 weight %), and (FIG. 3) ammonium nitrate/potassium nitrate (3.18 & 3.4 weight %) all show four endotherms (Melt →I, I→II, II→III, III→IV). These results indicate that both the potassium and sulfate ions are required to be present in ammonium nitrate in order to suppress the IV⇌III crystalline phase transition of ammonium nitrate. When the particles are humidified, a concentration of at least 2.5% potassium sulfate must be present to prevent the IV⇌III crystalline phase occurrence. The only major difference observed in the DSC scans of the humidified products compared to the fresh product is an approximate 18.8° C. decrease in the low temperature endotherm for the sample containing potassium nitrate (FIG. 3).

EXAMPLE 3

Moisture Absorption Test

Figure 5:
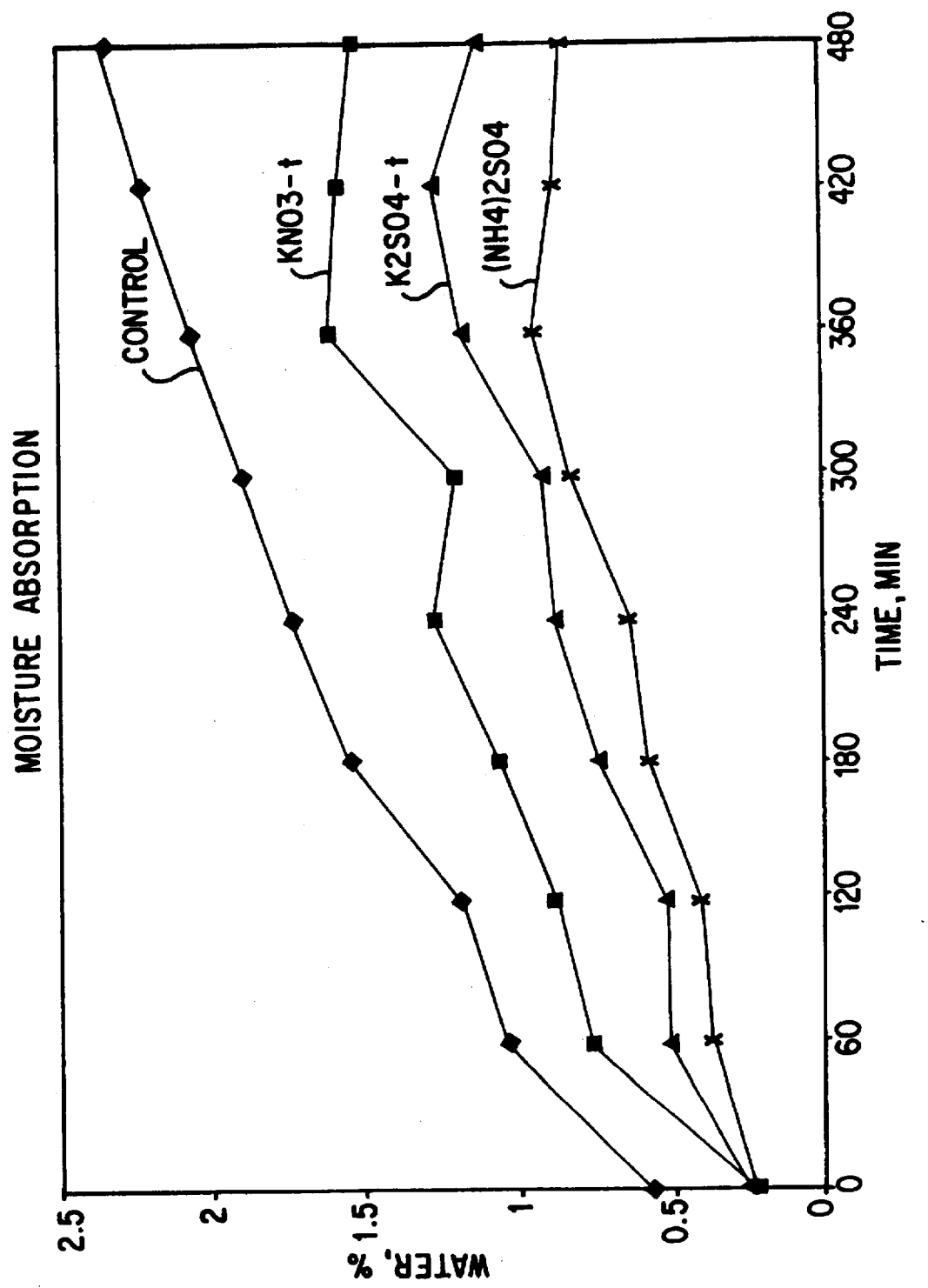
FIG. 5 depicts results obtained from the Moisture Absorption test, demonstrating the rates at which the particles will absorb moisture from the atmosphere.

The moisture absorption test requires that the ammonium nitrate particles be exposed to a constant 81% relative humidity at lab temperature for a given time. The amount of moisture absorbed during that period is measured using a Karl Fischer moisture titrator. The Moisture Absorption test demonstrates the relative rates at which different particle compositions will absorb moisture from the atmosphere; test results are given in FIG. 5. Slower moisture absorption is preferred. Ammonium nitrate particles containing ammonium sulfate at 1.43% having the lowest moisture absorption rate, followed by potassium sulfate at 2.88%, and potassium nitrate at 3.18%. The "control" sample had the highest moisture absorption rate.

EXAMPLE 4

Moisture Migration Test

The Moisture Migration Test determines the volume of expansion of 50 ml of bulk fertilizer particles as they are exposed to repeated temperature cycling between the IV⇌III crystalline phases in an air-tight container. In theory, the Moisture Migration Test simulates the temperature cycles the particles would undergo in storage. The test consists of cycling the particle temperature ten times between 25°→60°→25° C. These limits encompass the temperature at which the IV⇌III crystalline phase transition of ammonium nitrate occurs. Heating ammonium nitrate through 25°-60° C., causes a 4% volume increase of the particles. The data obtained from this test (FIG. 6) on pre-humidified particles show a 28% volume increase for the "control", a 36% increase for ammonium nitrate containing ammonium sulfate, a 4% increase for ammonium nitrate containing 3.18% technical-grade potassium nitrate, and no volume increase for ammonium nitrate samples containing 2.88% potassium sulfate, or that containing 3.41% potassium nitrate. The absence of an increase in volume for $(NH_4)_2NO_3$/reagent grade $KNO_3$ and the small volume change for $(NH_4)_2NO_3$/technical grade $KNO_3$ indicate that: (1) potassium ions alter the IV⇌III phase transition of ammonium nitrate; and (2) the concentration of potassium may affect the results. When the test was completed, the products containing reagent grade potassium nitrate, potassium sulfate and technical grade potassium nitrate were slightly caked, but retained excellent prill integrity. On the other hand, the "control" particles and particles containing ammonium sulfate were severely caked, with considerable prill degradation.

These results indicate that even humified particles containing as much as 3.0% water will not experience a IV⇌III phase transition at temperatures that will be encountered in storage when ammonium nitrate contains 2.7% potassium sulfate.

EXAMPLE 5

Burrell Shaker Test

The Burrell Shaker test measures the resistance of ammonium nitrate samples to breakage caused by a combination of thermal and physical shocks. In this test the samples are exposed to a temperature cycle between room temperature and 43° C., then mechanically shocked for thirty minutes via a Burrell Shaker. Prill degradation is then monitored versus the number of cycles through which they are subjected. The standard Burrell Shaker test is considered complete after 300 cycles, even if the particles have not degraded appreciably. The ammonium nitrate particles containing ammonium sulfate disintegrated much faster than the control. The only samples that did not totally break apart at less than 100 cycles are the ammonium nitrate/potassium nitrate and ammonium nitrate/potassium sulfate samples. At the end of the test (300 cycles), three of the four ammonium nitrate/potassium sulfate samples remained completely intact and in excellent condition. One of the ammonium nitrate/technical grade potassium sulfate samples started to chip after 264 cycles; however, at the conclusion of the tests only 8% of those particles were chipped. Four of the ammonium nitrate/technical grade potassium sulfate samples remained free-flowing throughout the test.

The $NH_4NO_3$/technical grade $KNO_3$ and $NH_4NO_3$/reagent grade $KNO_3$ samples started to chip after the 79th and 222nd cycles, respectively. By the end of the test, 46 and 20% of the particles containing reagent grade potassium nitrate, and 18 and 12% of the technical grade potassium nitrate particles had chipped. The particles in all four of these samples were stuck together each time the samples were checked. This clumping phenomenon probably helped reduce the number of particles that broke apart during the experiment. The testing was repeated with similar results. The data from these experiments are shown in FIGS. 6 and 7.

Combining data from all tests revealed that potassium sulfate is the superior additive for increasing the time ammonium nitrate can remain in bulk storage. Product containing potassium sulfate (1) had the lowest moisture absorption rate, (2) had the fewest particles broken during Burrell Shaker, and (3) does not swell during the moisture migration test. When ammonium nitrate contains potassium sulfate at a level of 2.0 weight percent, the quality of the product is similar to those containing at least 2.6% potassium sulfate. However, the product will undergo a crystalline phase transition at storage temperatures. The ammonium nitrate product containing potassium nitrate also showed improvement over ammonium nitrate. At the concentration investigated, the product will, however, experience a crystalline phase transition at storage temperatures. The ammonium nitrate containing potassium nitrate particles also stuck together during the Burrell Shaker test which indicates serious caking of this product in storage.

Having now fully described the invention, it will be apparent to one of ordinary skill in the art that many changes and modifications can be made thereto without departing from the spirit or scope of the invention as set forth herein.

TABLE 1

Analytical Data for Lab-Prilled Ammonium Nitrate Containing Magnesium Nitrate with Secondary Additives as Shown

| Analyses Additive, % | Control 0.0 | (NH$_4$)$_2$SO$_4$ 2.43 (1.77% SO$_4^2$) | CaSO$_4$ 2.75 (1.94 SO$_4^2$) | MgSO$_4$ 3.18[1] (2.5% SO$_4^2$) | K$_2$SO$_4$-t 2.88 (1.295% k$^+$) | K$_2$SO$_4$-r 2.82 (1.265% k$^+$) | KNO$_3$-t 3.18 (1.23% k$^+$) | KNO$_3$-r 3.41 (1.32% k$^+$) |
|---|---|---|---|---|---|---|---|---|
| N, % | 33.79 | 33.62[2] | 33.14 | 33.14 | 33.02 | 31.09 | 32.93 | 32.88 |
| pH | 6.7 | 6.0 | 6.2 | 6.7 | 6.5 | 6.9 | 6.7 | 6.6 |
| H$_2$O, % (Initial) | 0.57 | 0.23 | 0.44 | 0.28 | 0.26 | 0.38 | 0.23 | 0.28 |
| Moisture Absorption (After exposure to 81% Relative at Room Temp. for 4 Hours | 2.35 | 0.75 | — | — | 1.1 | — | 1.5 | — |
| Moisture Migration initial volume 50 ml volume after 10 cycles | 64 | 68 | 69 | 67.5 | 50 | 50 | 52 | 50 |
| Temperature of the IV↔III crystalline phase transition, °F. | 138.85 | 112.01 | 136.33 | 132.62 | No Transition | No Transition | 130.96 | 124.34 |

[1]Corrected for Mg from MgO.
[2]Adjusted for the amount of sulfuric acid generated from the analysis. Amount of sulfur determined by the LECO SC-430 analyzer
[3]Prills taken from bulk samples that were humidified for the moisture migration test. All samples were exposed to 81% humidity for 44 hours except K$_2$SO$_4$-t and (NH$_4$)$_2$SO$_4$ which were exposed for 72 hours.

What is claimed is:

1. A fertilizer comprising prills of ammonium nitrate, said prills consisting essentially of ammonium nitrate and from about 2.0–6.0 wt. % potassium sulfate.

2. A fertilizer comprising prills of ammonium nitrate, said prills consisting essentially of ammonium nitrate, a magnesium compound as an internal additive, and from about 2.0–6.0 wt % potassium sulfate.

3. The fertilizer of claim 2, wherein said prills exhibit substantially less caking, clumping and disintegration into fines than ammonium nitrate prills without potassium sulfate.

4. The fertilizer of claim 2, wherein said potassium sulfate is present in about 2.5–3.5 weight percent.

5. The fertilizer of claim 1, wherein said prills exhibit substantially no crystal phase IV⇌III transition when prills are exposed to hot, humid storage conditions.

6. The fertilizer of claim 2, wherein said hot, humid conditions range from 18°–42° C. and 25–95 percent relative humidity.

7. A method of making the fertilizer of claim 2, comprising:
   forming a concentrated solution of ammonium nitrate and magnesium nitrate as an internal additive,
   adding to said concentrated solution 2.0–6.0% by weight potassium sulfate, and
   cooling the resulting solution in a manner to provide solid particles of ammonium nitrate fertilizer.

8. The process of claim 7, where said prills are further coated with a reaction product of an amine and a siloxane, wherein said coating further stabilizes said fertilizer particles against caking, cracking or clumping.

9. The process of claim 7, wherein said potassium sulfate is added in an amount of 2.5–3.5 weight percent.

10. A fertilizer comprising prills of ammonium nitrate, said prills consisting essentially of ammonium nitrate and from about 2.0–6.0 wt. % potassium sulfate and coated with the reaction product of an amine and a siloxane.

11. A fertilizer comprising prills of ammonium nitrate, said prills consisting essentially of ammonium nitrate, a magnesium compound as an internal additive and from about 2.0–6.0 wt. % potassium sulfate and coated with the reaction product of an amine and siloxane.

12. The fertilizer of claim 11, wherein said potassium sulfate is present in an amount of about 2.5–3.5 wt. %.

13. The fertilizer of claim 11, wherein said prills exhibit substantially no crystal phase IV⇌III transition when prills are exposed to hot, humid conditions.

14. The fertilizer of claim 13, wherein said hot, humid conditions range from 18°–42° C. and 25–95% relative humidity.

15. The fertilizer of claim 11, wherein said prills exhibit substantially less caking, clumping and disintegration into fines than ammonium nitrate prills lacking potassium sulfate.

* * * * *